April 27, 1954     E. L. WHITE     2,676,817
FIFTH WHEEL LOCK ASSEMBLY

Filed Feb. 15, 1952     2 Sheets-Sheet 1

INVENTOR
EDWIN L. WHITE
BY John N. Rudolph
ATTORNEY

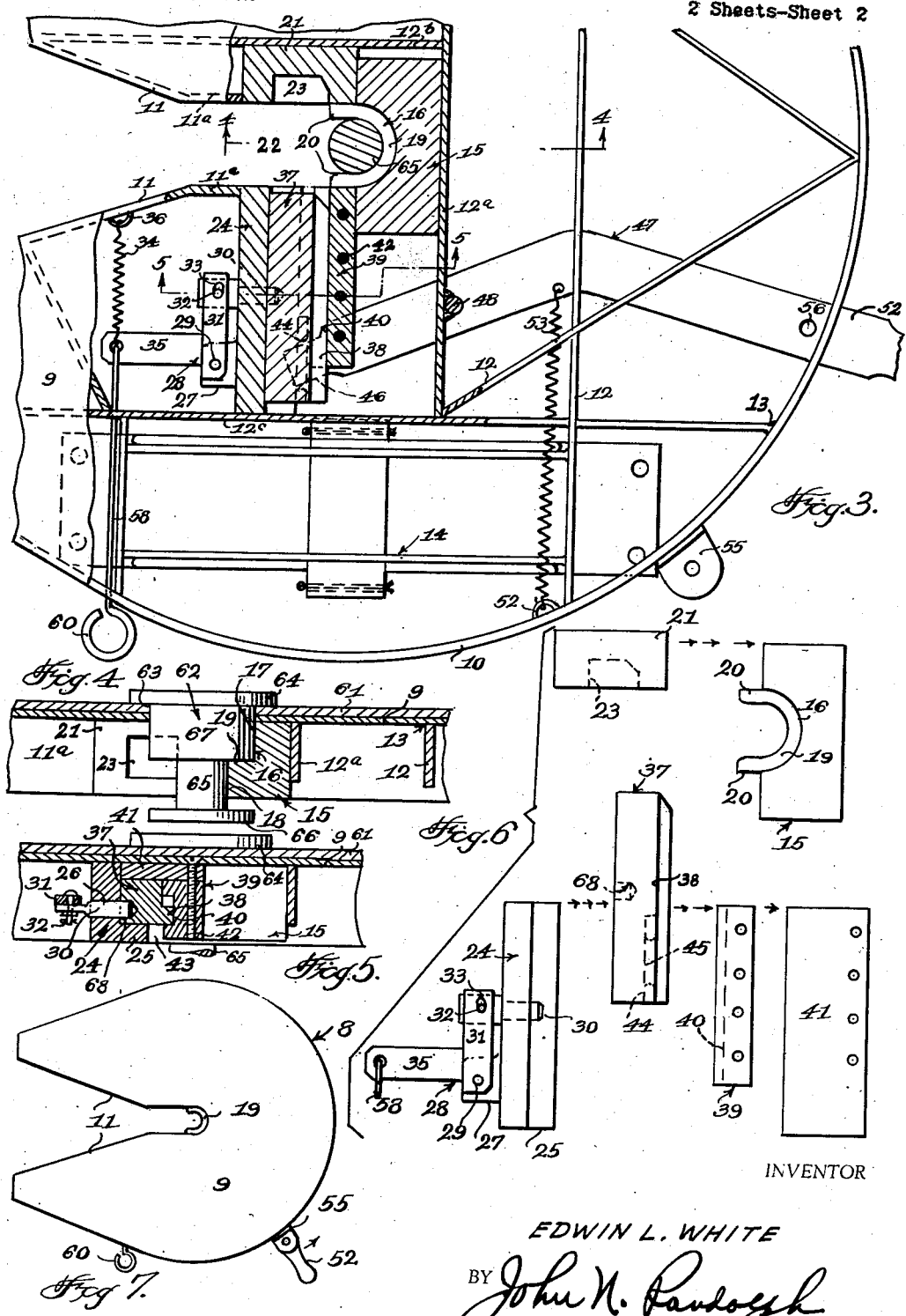

Patented Apr. 27, 1954

2,676,817

UNITED STATES PATENT OFFICE 2,676,817

FIFTH WHEEL LOCK ASSEMBLY

Edwin L. White, Atlanta, Ga.

Application February 15, 1952, Serial No. 271,781

5 Claims. (Cl. 280—437)

This invention relates to a novel coupling unit of the fifth wheel type primarily adapted for coupling a draft vehicle to a trailer vehicle, and more particularly to an improved locking device for the fifth wheel structure which is of extremely simple construction yet which will be very effective for safely locking a trailer vehicle to a draft vehicle.

More particularly, it is an aim of the present invention to provide a fifth wheel unit having a sliding latch bar and a positive means for locking the latch bar in either a latched or unlatched position and by means of which the latch bar is automatically locked in either of said positions.

Another primary object of the invention is to provide a fifth wheel unit wherein the latch bar is automatically projected to a latching position upon manual operation of the locking device and wherein movement of the latch bar to a released position must be manually accomplished and while the locking device is manually held in a released position to thereby minimize the possibility of an accidental releasing of the kingpin from the fifth wheel.

A further object of the invention is to provide a locking assembly which will effectively engage and support two portions of a kingpin of different diameters when the parts are in a coupled position.

A further object of the invention is to provide a locking mechanism which is so constructed that the latch bar may not be accidentally released to assume a latching position before the kingpin has been fully seated in the fifth wheel to be latched by the latch bar.

Various other objects and advantages of the invention will hereinafter become more fully apparent from the following description of the drawings, illustrating a presently preferred embodiment thereof, and wherein:

Figure 4 is a vertical sectional view partly in side elevation, taken substantially along a plane as indicated by the line 4—4 of Figure 3;

Figure 5 is a similar view taken substantially along a plane as indicated by the line 5—5 of Figure 3;

Figure 6 is an exploded plan view of a number of the parts constituting a lock assembly;

Figure 7 is a plan view on a reduced scale of the fifth wheel structure, and

Figure 8 is a perspective view of the latch bar.

Figure 1:
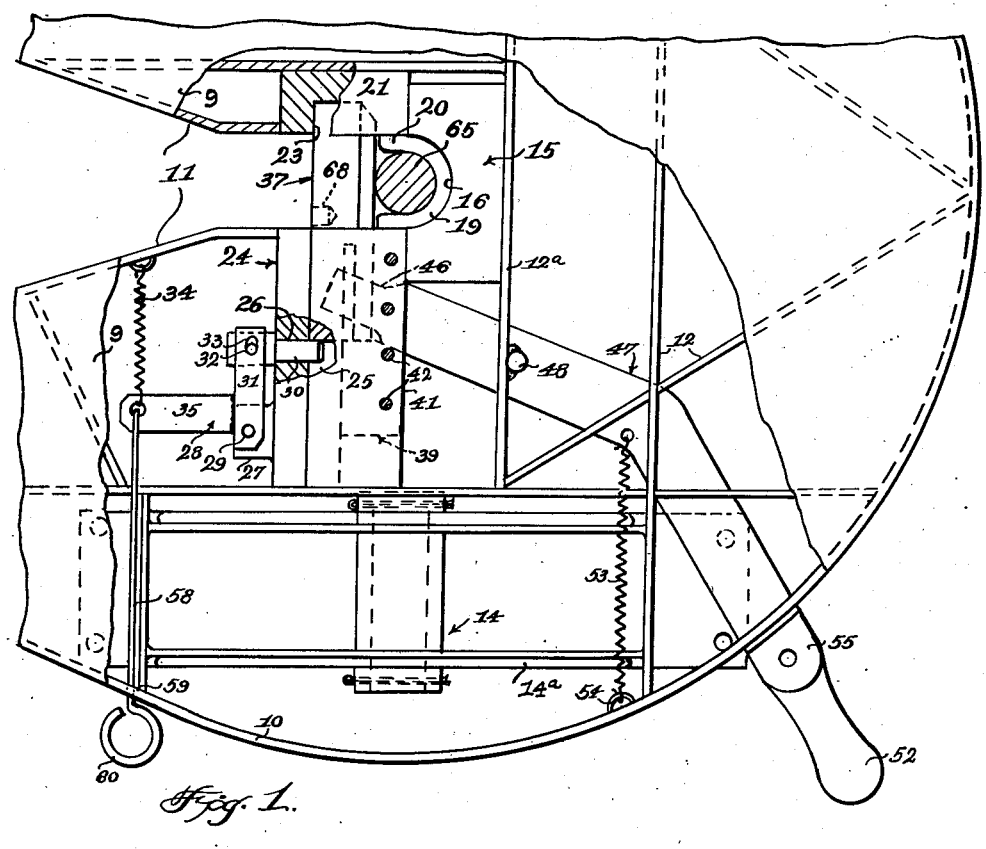
Figure 1 is a fragmentary top plan view partly broken away showing the fifth wheel structure in a latched position, certain of the parts being shown fully or partially in section.

Referring more specifically to the drawings, the body portion, designated generally 8 of the fifth wheel includes a top wall or plate 9, an outer side wall 10 and complementary inner side walls 11 forming the throat or entrance opening of the fifth wheel, as is conventional, and as best illustrated in Figure 7. The body portion 8 also includes a plurality of web members 12 having upper edges welded or otherwise secured to the underside of the top wall 9 and which are likewise welded or otherwise secured to one another and certain of which are additionally welded or otherwise secured to the outer wall 10 and inner walls 11, as indicated by the welds 13. The fifth wheel unit or body 8 is mounted for rocking movement about an axis disposed transversely thereof by means of trunnion units 14, each of which includes a bottom section 14a which is adapted to be mounted on and secured to a portion of a draft vehicle, not shown, and an upper section 14b which is secured to and depends from the fifth wheel 8. The two trunnion units 14 are mounted on opposite sides of the longitudinal center of the fifth wheel 8, as defined by the rearwardly opening throat, formed by the inner walls 11, so that the forward and rear ends of the fifth wheel unit 8 may rock upwardly and downwardly.

Figure 2:
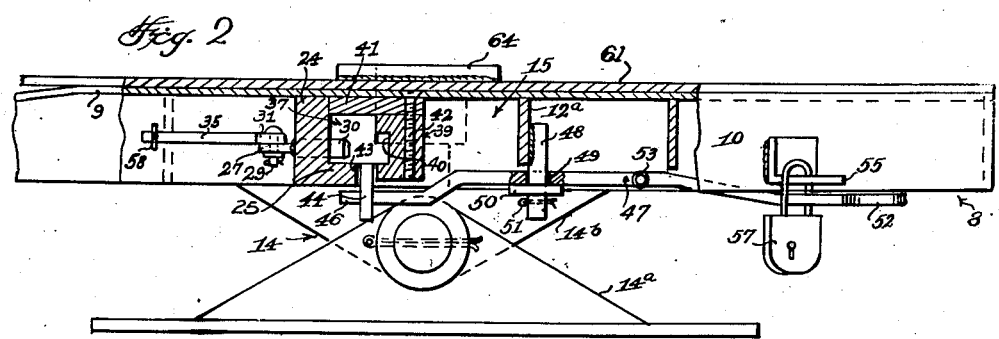
Figure 2 is a fragmentary side elevational view, partly in vertical section thereof.
Figure 3:
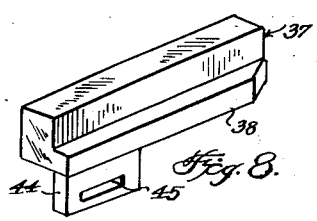
Figure 3 is a horizontal sectional view partly in top plan of a portion of the fifth wheel showing the parts locked in an unlatched position.

A stop block 15 is mounted in the fifth wheel unit or body 8 and is suitably secured to the rear side of a transverse web 12a. The stop block 15 has a recess 16 cut in its rear face, an upper portion 17 of which is deeper than the lower portion thereof whereby the upper surface 19 and the lower portion 18 of said recess defines an upwardly facing shoulder. Said stop block 15 is provided with two rearwardly projecting extensions 20 which form extensions of the ends of the bottom recess portion 18, the upper surfaces of which extensions are disposed in the same plane as the upwardly facing shoulder 19. The stop block recess 16 is disposed forwardly of and in alignment with the space between the forward parallel end portions 11a of the inner walls 11, which wall portions 11a terminate rearwardly of the block 15. A latch bar receiving block 21 is mounted on one side of the inner end of the kingbolt receiving throat 22 between one end of the rear side of the block 15 and the wall portion 11a which is disposed therebehind and said block 21 is suitably secured to said parts and to a web 12b of the fifth wheel structure 8. The block 21 is provided with a latch bolt receiving recess 23, as best seen in Figure 3, which opens into one side of the throat 22 rearwardly of and adjacent one of the extensions 20. An elongated guide block 24 is disposed at the opposite side of the throat 22 and extends transversely therefrom. The guide block 24 has an inner end which is secured to the forward end of the other wall portion 11a and an outer end which is secured to one of the webs 12c, which is disposed parallel to the throat 22. As best illustrated in Figures 2 and 5, the bottom portion of the guide block 24 is provided with a forwardly extending shelf 25 which projects from the forward side thereof and which extends from end-to-end of the guide block. The guide block 24 is provided intermediate of its ends with a transverse bore 26 which is disposed above the level of the shelf 25. An apertured lug or ear 27 projects rearwardly from the guide block 24 near its outer end to provide a support for the apex portion of a bell crank 28 which is pivotally connected by a pivot pin 29 to the ear 27, at the apex of the bell crank. A lock pin 30 slidably engages the bore 26 and has an outer rear end which is connected to one leg 31 of the bell crank 28 by a pivot pin 32 which loosely engages a longitudinally elongated opening 33 in said leg 31. A pull spring 34 has one end connected to the distal end of the other leg 35 of the bell crank 28. The opposite end of the pull spring 34 is connected by an eye 36 to the adjacent inner walls 11, so that the pull spring urges the bell crank to swing clockwise on its pivot 29 as illustrated in Figure 3 for urging the locking pin 30 forwardly through the guide block 24 toward a projected position. A latch bar 37 is slidably mounted on the shelf 25 and is of a length no greater than the length of the guide block 24. The latch bar 37 is provided with a flange 38 which extends from the forward side thereof adjacent the bottom of the latch bar and which is of a width corresponding to the width of the extensions 20 and of the shelf 18 of the recess 16.

A guide bar 39 is disposed forwardly of the latch bar 37 has a rearwardly opening channel 40 extending from end-to-end thereof for slidably accommodating the flange 38. A reinforcing plate 41 is disposed against the underside of the top wall 9 above the guide bar 39 and the latch bar 37. The plate 41 and bar 39 are secured to the top wall 9 by a plurality of threaded fastenings 42 which extend downwardly through the top wall 9 and plate 41 and which threadedly engage in the bar 39. The bottom portion of the bar 39 is spaced from the shelf 25 to form a slot 43 therebetween to slidably receive a shift lug 44 which is secured to and extends downwardly from the latch bar 37, as best seen in Figures 2 and 8. The shift lug 44 is provided with a slot 45 to loosely receive a restricted end 46 of a shift lever 47. A pivot pin 48 is fixed to and depends from the web 12a and is loosely received in an opening 49 of the shift lever 47, which opening is disposed near the lever end 46. Said lever end 46 is downwardly offset relatively to the intermediate portion of the lever, as best illustrated in Figure 2 and said intermediate lever portion is disposed beneath the webs 12. A washer 50 and cotter pin 51, which engage the lower portion of the pin 48 turnably supports the lever on said pin. The other terminal portion 52 of the shift lever 47 is likewise downwardly offset and forms a handle which normally projects outwardly from the outer wall 10. The lever 47 is bent intermediate of its ends so that the end portions thereof are disposed at oblique angles to one another. One end of a pull spring 53 is connected to the shift lever 47 adjacent the bend thereof and the opposite end of the pull spring is connected to the outer wall 10 by an eye 54. The spring 53 urges the lever 47 to swing clockwise on the pin 48, as illustrated in Figure 1, for displacing the latch bar 37 inwardly across the throat 22 into a latching position. An apertured keeper lug 55 is secured to a portion of the outer wall 10 and extends outwardly therefrom and the opening thereof is disposed above an opening 56 in the shift lever 47 when the latch bar 37 is in a projected, latching position, so that the bail of a padlock or the like as seen at 57 may engage the opening 56 and the opening of the keeper lug 55 to retain the shift lever 47 against swinging movement toward its position of Figure 3 and to thus effectively retain the latch bar 37 in a latched position and prevent tampering with the coupled fifth wheel unit. However, the padlock 57 is not essential and need not be used.

A pull rod 58 extends loosely through an opening 59 in the outer wall 10 and has an inner end which is connected to the distal end of the bell crank leg 35 and an outer end forming a handle 60 which is disposed outwardly of the wall 10. The pull rod 58 extends from the leg 35 in the opposite direction to the spring 34.

A wear plate 61, which is adapted to be secured to the underside of a portion of a trailer vehicle, not shown, has a kingpin, designated generally 62, extending through an opening 63 thereof. The kingpin 62 has a head 64 which engages the upper side of the wear plate 61 around the opening 63. The shank of the king pin 62 which depends from the head 64 includes a restricted neck portion 65 having an enlargement 66 at its lower end forming the lower end of the kingpin. The kingpin shank also includes an enlarged upper portion or collar 67 which is disposed between the head 64 and the upper end of the neck 65.

Assuming that the latch bar 37 and shift lever 47 are in their positions of Figure 3, when thus disposed, the locking pin 30 will seat in a recess 68 which opens outwardly of the rear side wall of the latch bar 37 and will be held thus positioned by the spring 34. It will be readily apparent that as the latch bar 37 is retracted by a counterclockwise swinging movement of the shift lever 47 to its position of Figure 3 from its position of Figure 1, that when the recess 68 moves into alignment with the lock pin 30, the spring 34 will then cause the bell crank 28 to swing clockwise as seen in Figure 3 to project the pin 30 into the recess 68 to thereby lock the latch bar 37 in a retracted position with the shift lever 47 in its position of Figure 3. The fifth wheel unit may then be moved rearwardly by the vehicle on which it is mounted to cause the kingpin 62 to enter the open rear end of the body member 8 as defined by the inner walls 11 and to be guided by said walls into the throat 22 and into its position of Figure 3 with the kingpin stem 65 engaging the inner wall of the shelf 18 of the recess 16 and a portion of the bottom surface of the collar 67 resting on or disposed above the upper surface 19 of said shelf and above the upper surfaces of the extensions 20.

The rod 58 is moved outwardly by a pull on the handle 60 to swing the bell crank 28 counterclockwise on its pivot 29 for displacing the locking pin 30 out of engagement with the recess 68. When this occurs, the tensioned pull spring 53 will swing the shift lever 47 clockwise on the pivot 48 from its position of Figure 3 to its position of Figure 1. This movement of the shift lever 47 will also cause the latch bar 37 to slide inwardly across the throat 22 and to position said latch bar with its leading end seated in the keeper recess 23. As the latch bar 37 completes its movement to a projected position its trailing end will clear or move past the locking pin 30 whereupon the pull spring 34 will rock the bell crank 28 clockwise as seen in Figure 3 to project the pin 30 into the space above the shelf 25 behind the trailing end of the latch bar 37, as illustrated in Figure 1, to thus lock the bar 37 in its projected position of Figure 1 and to likewise retain the shift lever 47 in its position of Figure 1. Thus, the padlock 57 is unnecessary except to prevent unauthorized tampering with the latch coupling. However, there is no risk of the latch bar being inadvertently moved to a released position since in order to accomplish this the pull rod 58 must first be pulled outwardly against the tension of the spring 34 to retract the locking pin 30 after which the lever 47 must be swung counterclockwise toward its position of Figure 3 from its position of Figure 1 in order to accomplish an unlatching of the kingpin 62, both of which manual operations must be accomplished against the action of the pull springs and with the movement of the shift lever 47 accomplished while the locking pin 30 is held retracted by a manual pull on the rod 58.

It will thus be seen that a fifth wheel locking assembly of extremely simple construction has been provided yet which is extremely effective and foolproof and wherein any risk of accidental release of the coupled kingpin is eliminated.

However, when the latch bar 37 moves to its projected position its leading end is supported in the keeper recess 23 and the flange 38 thereof engages the kingpin neck 65 and engages under the collar 67 to cooperate with the shelf 18 of the recess 16 and the extensions 20 to both retain and support the kingpin. Likewise, as previously mentioned, the locking pin 30 automatically assumes a projected position behind the projected latch bar 37 so that locking of the latch bar in a projected position is accomplished automatically and therefore may not be overlooked. This likewise applies to the automatic locking of the latch bar in a retracted position by the pin 30 engaging the recess 68, so that while two manual operations are required to initiate movement of the latch bar toward either a projected or retracted position, automatic locking of the latch bar in either of said positions is thereafter accomplished.

Various modifications and changes are contemplated and may obviously be resorted to, without departing from the spirit or scope of the invention as hereinafter defined by the appended claims.

I claim as my invention:

1. In a fifth wheel having an entrance opening terminating at its inner end in a kingpin receiving throat, a stop block disposed across an end of the throat which is disposed remote from the entrance opening, said stop block having a recess opening into the throat and defining a closed end thereof adapted to receive a kingpin, a latch bar guide mounted in the fifth wheel on one side of the throat and extending transversely therefrom, a latch bar slidably mounted in said guide and movable to a projected position across the throat or to a retracted position out of engagement with the throat, a shift lever swingably connected to the fifth wheel structure and disposed therebeneath, said shift lever being pivotally mounted near one end thereof, said end of the shift lever being connected to the latch bar, spring means connected to the shift lever and fifth wheel and urging the shift lever to swing in one direction for displacing the latch bar only to a projected position across the throat, the opposite end of said shift lever being manually engageable for swinging the shift lever in the opposite direction to move the latch bar to a retracted position, said latch bar guide having a transverse bore, a locking pin slidably mounted in the transverse bore of the latch bar guide for movement transversely of the latch bar and disposed when in a projected position to engage behind the latch bar when the latch bar is in a projected, latching position, said latch bar having a recess for receiving the locking pin when the latch bar is in a fully retracted position, manually engageable means connected to the pin and movable in one direction for moving the pin to a retracted position to release the latch bar, and a spring connected to the fifth wheel and to said manually engageable means to move said manually engageable means in the opposite direction for normally urging the locking pin to a projected position.

2. A fifth wheel structure as in claim 1, a kingpin including a collar and a neck disposed beneath the collar and of smaller cross sectional size than the collar, said neck and collar engaging in the stop block recess, said stop block having a shelf defining the bottom portion of the recess thereof, said stop block shelf engaging against the kingpin neck and beneath the kingpin collar, said latch bar having a shelf at one side thereof and adjacent its bottom, said latch bar shelf engaging against a portion of the kingpin neck and beneath a portion of the kingpin collar for cooperating with the stop block shelf to retain and support the kingpin when the latch bar is in a projected position.

3. A fifth wheel structure as in claim 1, said shift lever having portions disposed at an oblique angle to one another and being pivotally mounted between the apex of said portions and the first mentioned end of the shift lever.

4. A fifth wheel structure as in claim 1, said manually engageable means including a bell crank pivotally mounted at its apex on a portion of the latch bar guide and having one leg connected to the locking pin and its other leg connected to the last mentioned spring, and a pull rod connected to the last mentioned leg of the bell crank and extending outwardly from the fifth wheel structure for rocking the bell crank in one direction to retract the locking pin out of engagement with the latch bar and for tensioning the last mentioned spring whereby the locking pin will be returned by the last mentioned spring to a projected position when the latch bar is fully projected or fully retracted for locking the latch bar in either of said positions when the pull rod is released.

5. In a fifth wheel structure having an entrance opening merging at its inner end with a rear end of a kingpin receiving throat, a stop block disposed across the forward end of the throat having a kingpin receiving recess opening into the throat adapted to receive a portion of a kingpin, a latch bar guide secured in the fifth wheel at one side of the throat, a latch bar slidably mounted in the guide and movable transversely of the throat to a projected position across the throat and to a retracted position out of engagement with the throat, manually actuated means connected to the latch bar for displacing it to a retracted position, a first spring connected to the manually actuated means and urging the latch bar to a projected position, said latch bar having longitudinally spaced locking pin engaging portions, a locking pin slidably mounted transversely in the latch bar guide and disposed when in a projected position for selectively engaging said latch bar portions for locking the latch bar in either a projected latching position or a retracted position, a second spring urging the locking pin to a projected position, and a second manually actuated means connected to the locking pin and second spring for retracting the locking pin and loading the second spring whereby the latch bar may be automatically moved to a projected position by the first mentioned spring or manually moved to a retracted position by the first mentioned manually actuated means and automatically locked in either of said positions when the locking pin is projected by the second spring.

References Cited in the file of this patent

UNITED STATES PATENTS

| Number | Name | Date |
|---|---|---|
| 1,287,973 | Gruber | Dec. 17, 1918 |
| 1,351,300 | Miller | Aug. 31, 1920 |
| 1,951,258 | Retzlaff | Mar. 13, 1934 |
| 2,031,256 | Dorsey, Jr. | Feb. 18, 1936 |
| 2,142,748 | Fontaine | Jan. 3, 1939 |
| 2,294,710 | Berg et al. | Sept. 1, 1942 |
| 2,371,750 | Fontaine | Mar. 20, 1945 |
| 2,431,779 | Stevens | Dec. 2, 1947 |
| 2,456,826 | Fontaine et al. | Dec. 21, 1948 |